UNITED STATES PATENT OFFICE.

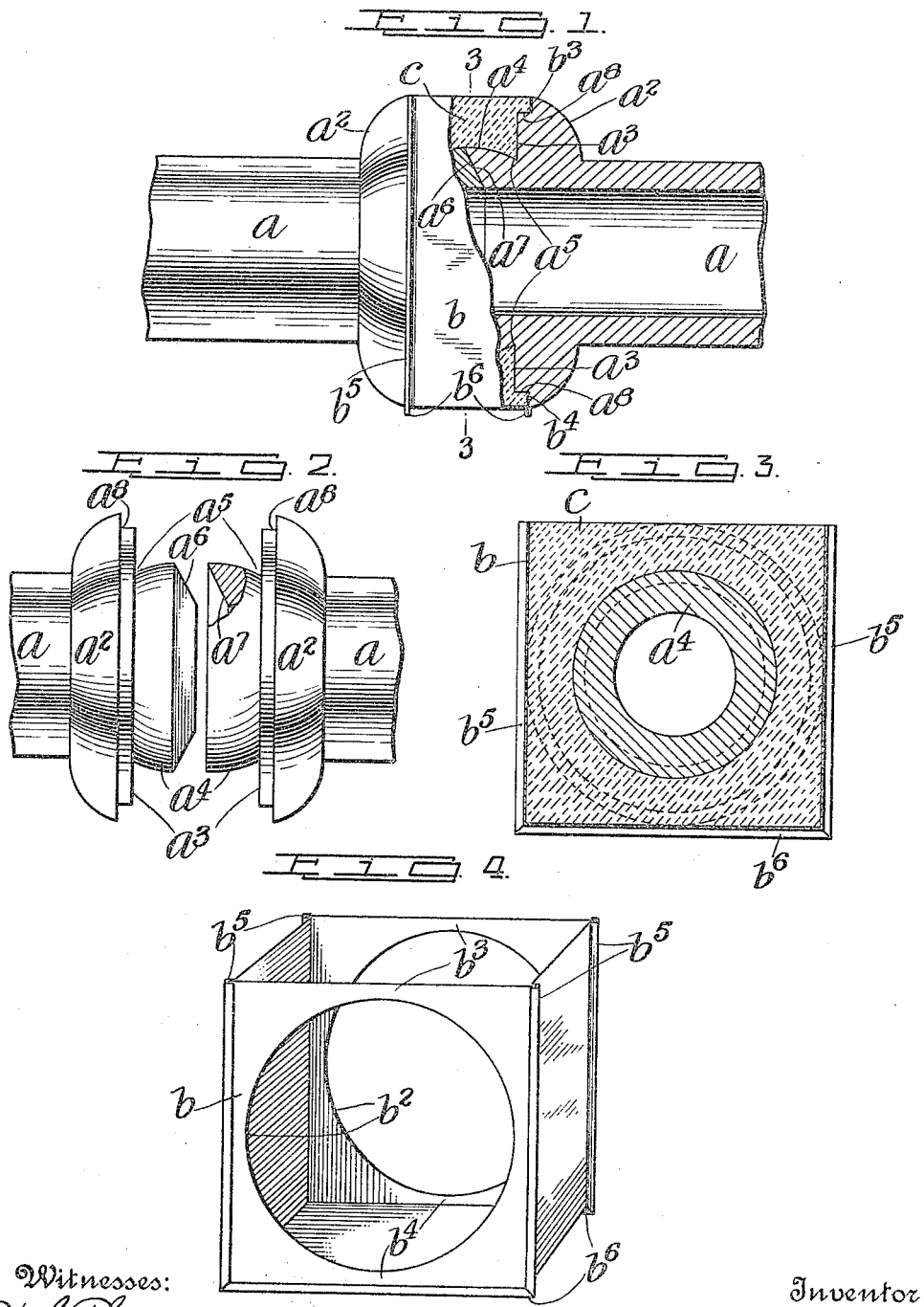

PETER F. BROWN, OF HUNTINGTON, NEW YORK, ASSIGNOR OF ONE-HALF TO CLARENCE R. IRWIN, OF HUNTINGTON, NEW YORK.

COUPLING FOR TILE PIPES.

1,231,699. Specification of Letters Patent. Patented July 3, 1917.

Application filed March 23, 1916. Serial No. 86,298.

*To all whom it may concern:*

Be it known that I, PETER F. BROWN, a citizen of the United States, and residing at Huntington, L. I., in the county of Suffolk and State of New York, have invented certain new and useful Improvements in Couplings for Tile Pipes, of which the following is a specification, such as will enable those skilled in the art to which it appertains to make and use the same.

This invention relates to couplings or joints for tile pipes used as water pipes, drainage pipes, sewer pipes and the like; and the object thereof is to provide an improved coupling or joint of this class which is simple in construction, efficient in use and which is comparatively inexpensive and which will exclude both water and air and form a safe and reliable coupling or joint.

The invention is fully disclosed in the following specification, of which the accompanying drawing forms a part, in which the separate parts of my improvement are designated by suitable reference characters in each of the views, and in which:—

Figure 1 is a side view partly in section showing my complete coupling;

Fig. 2 a similar view but showing only the pipe sections and the heads to be coupled together, with part of the construction of one of said heads broken away;

Fig. 3 a section on the line 3—3 of Fig. 1; and,

Fig. 4 a perspective view of a mold box or casing which I employ in making my improved coupling.

In the drawing forming part of this specification, I have shown at $a$ two tile pipe sections and, in the practice of my invention, the ends of said pipe sections to be coupled or connected, are provided with enlarged annular heads $a^2$ having corresponding flat annular faces $a^3$ and central projecting members $a^4$ which are beveled or rounded on their outer surfaces to form deep annular grooves $a^5$. One of the central projecting members $a^4$ has a beveled extension $a^6$ and the other is annularly recessed as shown at $a^7$ to receive the part $a^6$. The outer edge portion of the faces $a^3$ of each of the heads $a^2$ is provided with an annular rabbet groove $a^8$. I also provide a mold box or casing $b$ which is preferably composed of sheet metal and which is rectangular in form and the top of which is open. The opposite sides thereof are provided with circular apertures $b^2$. In connecting the pipe sections the heads $a^3$ thereof are inserted into the opposite sides of the mold box or casing $b$, as shown in Fig. 1, in which operation one of the parts $a^4$ abuts against the other part $a^4$ of the heads of the pipe sections as clearly shown in said figure.

The mold box or casing $b$ is provided at the top of the opposite sides thereof in which the apertures $b^2$ are formed with narrow strips $b^3$ and at the bottom of said sides with similar narrow strips $b^4$, and said mold box or casing is also provided, in the form of construction shown, with flanges $b^5$ at the corners of the front, back and sides thereof and also with depending bottom side flanges $b^6$, but the exact method of making said box or casing is immaterial, all that is necessary being to provide a mold box or casing having the general form of that herein shown and described.

After the heads $a^2$ of the pipe sections have been inserted into the mold box or casing, as shown in Fig. 1, a suitable cement $c$ is poured into the top of said mold box or casing and said cement flows down into the bottom thereof and gradually rises therein until the mold box or casing is entirely filled therewith, after which the cement is allowed to set or become hard and thus securely locks or binds the pipe sections together, as will be readily understood.

The cement which I prefer to use in the above described operation is preferably a bituminous compound, this being employed for the purpose of making an absolutely air and water tight joint, and when this form of cement is used I also coat or cover the outer surfaces of the parts $a^4$ and the faces $a^3$ and the grooves $a^5$ with asphaltum or similar material to aid in producing the desired result, it being understood that the bituminous compound or cement will adhere more readily to the surfaces named, when said surfaces have been coated with asphaltum as stated.

By pouring the cement gradually into the mold box or casing in the above described operation all air and moisture is forced out of said mold box or casing as the cement rises therein, and a perfectly air and water tight joint is produced.

From the foregoing description it will be seen that the central body portion of my improved coupling when completed is rectangular in form and includes the mold box or casing; and the connection of the mold box or casing with the ends of the pipe sections to be coupled, or the connection of said pipe sections with the mold box or casing, and the subsequent pouring of the cement into said mold box or casing are facilitated by reason of the rectangular shape thereof and the fact that the open side of the same is uppermost.

It will be observed that the parts $a^6$ and $a^7$ form substantially a tongue and groove connection, but my invention is not limited to the exact form of these parts, as herein shown and described, and any suitable connection of this class may be employed. While I have shown and described the preferred form of my improvement, my invention is not limited to the exact details thereof, as herein set out, and changes therein and modifications thereof may be made, within the scope of the appended claims, without departing from the spirit of my invention or sacrificing its advantages.

Having fully described my invention, what I claim as new and desire to secure by Letters Patent, is:—

1. The herein described means for connecting the ends of tile pipe sections, said pipe sections being provided with enlarged heads at the ends thereof and said heads being provided with abutting members, and said heads being also provided in their adjacent faces with annular rabbet grooves, consisting of a mold box or casing open at the top and the opposite sides of which are provided with large circular apertures through which the abutting members of the heads are inserted and the apertured sides of said mold box or casing being adapted to fit in said rabbet grooves, and a cement binder poured into said mold box or casing.

2. The herein described means for connecting the ends of tile pipe sections provided with enlarged heads having projecting and abutting members, said members being provided with annular grooves and said heads being provided in their adjacent faces and at the perimeters thereof with annular rabbet grooves, consisting of a mold box or casing open at the top and opposite sides of which are provided with large circular apertures through which the abutting members of the heads are inserted, the apertured sides of said mold box or casing being adapted to fit in said rabbet grooves, and a cement binder poured into the open top of said mold box or casing and inclosing the abutting members.

3. The herein described means for connecting the ends of tile pipe sections, comprising enlarged annular heads formed on the ends of said pipe sections and provided with reduced projecting and abutting members having annular cement receiving grooves, and a rectangular mold box or casing open at the top and opposite sides of which are provided with large circular apertures through which the abutting members of the heads of the pipe sections are inserted, and a cement binder poured into said mold box or casing and inclosing said abutting members.

4. The herein described means for connecting the ends of tile pipe sections provided with enlarged heads having projecting and abutting members and said heads being provided in their adjacent faces and at the perimeters thereof with annular rabbet grooves, consisting of a rectangular mold box or casing open at the top and opposite sides of which are provided with large circular apertures through which the abutting members of the heads are inserted, the apertured sides of said mold box or casing fitting in said rabbet grooves, and a cement binder poured into the open top of said mold box or casing and inclosing the abutting members.

In testimony that I claim the foregoing as my invention I have signed my name in presence of the subscribing witnesses this 21st day of March 1916.

PETER F. BROWN.

Witnesses:
C. MULREANY,
N. E. THOMPSON.

Copies of this patent may be obtained for five cents each, by addressing the "Commissioner of Patents, Washington, D. C."